United States Patent
Rico et al.

(10) Patent No.: US 6,833,640 B2
(45) Date of Patent: Dec. 21, 2004

(54) METHOD AND APPARATUS TO TUNE ROTOR'S TORSIONAL NATURAL FREQUENCY BY GEOMETRY OF ROTOR WINDING SLOT

(75) Inventors: Raul Rico, Oviedo, FL (US); Christopher W. Ross, Oviedo, FL (US); Richard B. Chianese, Altamonte Springs, FL (US); Kevin M. Light, Maitland, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 55 days.

(21) Appl. No.: 09/731,501

(22) Filed: Dec. 7, 2000

(65) Prior Publication Data

US 2002/0070622 A1 Jun. 13, 2002

(51) Int. Cl.[7] ................................................ H02K 7/04
(52) U.S. Cl. .......................................... 310/51; 310/261
(58) Field of Search ........................... 310/261, 51, 210, 310/214

(56) References Cited

U.S. PATENT DOCUMENTS

| | | | |
|---|---|---|---|
| 1,028,985 A * | 6/1912 | Behrend | 310/262 |
| 1,178,771 A * | 4/1916 | Zehrung et al. | 310/61 |
| 1,931,961 A * | 10/1933 | J. Kopeliowitsch | 310/264 |
| 2,698,910 A | 1/1955 | Blyth | 310/51 |
| 3,119,033 A * | 1/1964 | Horsely et al. | 310/64 |
| 3,395,299 A * | 7/1968 | Quay et al. | 310/261 |
| 3,832,584 A | 8/1974 | DePaul | 310/211 |
| 4,365,178 A | 12/1982 | Lenz | 310/61 |
| 4,367,413 A * | 1/1983 | Nair | 290/52 |
| 4,390,806 A * | 6/1983 | O'Brien et al. | 310/261 |
| 4,473,765 A * | 9/1984 | Butman et al. | 310/215 |
| 4,508,985 A * | 4/1985 | Pavlik et al. | 310/270 |
| 4,568,846 A | 2/1986 | Kapadia | 310/156 |
| 4,719,381 A | 1/1988 | Miles | 310/166 |
| 4,827,172 A | 5/1989 | Kobayashi | 310/216 |
| 4,843,271 A * | 6/1989 | Shah | 310/261 |
| 4,859,891 A * | 8/1989 | Jenkins et al. | 310/61 |
| 4,874,215 A | 10/1989 | Montagu | 350/6.6 |
| 4,900,956 A * | 2/1990 | Gavilondo et al. | 310/261 |
| 4,900,964 A * | 2/1990 | Ying et al. | 310/261 |
| 5,030,871 A * | 7/1991 | Shah et al. | 310/261 |
| 5,065,064 A * | 11/1991 | Kaminski | 310/61 |
| 5,521,447 A | 5/1996 | Bertolini et al. | 310/51 |
| 6,002,190 A | 12/1999 | Kieffer | 310/216 |
| 6,072,257 A | 6/2000 | Akemakou | 310/191 |
| 6,265,805 B1 * | 7/2001 | Debleser | 310/261 |

FOREIGN PATENT DOCUMENTS

| | | | | |
|---|---|---|---|---|
| DE | 3433450 A1 * | 3/1986 | | H02K/1/16 |
| JP | 64001437 A * | 1/1989 | | H02K/1/32 |

* cited by examiner

Primary Examiner—Burton S. Mullins

(57) ABSTRACT

A method and apparatus for tuning the torsional natural frequency of a rotor is disclosed. At least one tuning slot is formed within the winding slots defined by radially projecting winding teeth. The tuning slot extends radially inward from the bottom of the winding slot a distance to tune the rotor to a desired torsional natural frequency. This tuning slot can be positioned preferably at the quadrature axis.

6 Claims, 1 Drawing Sheet

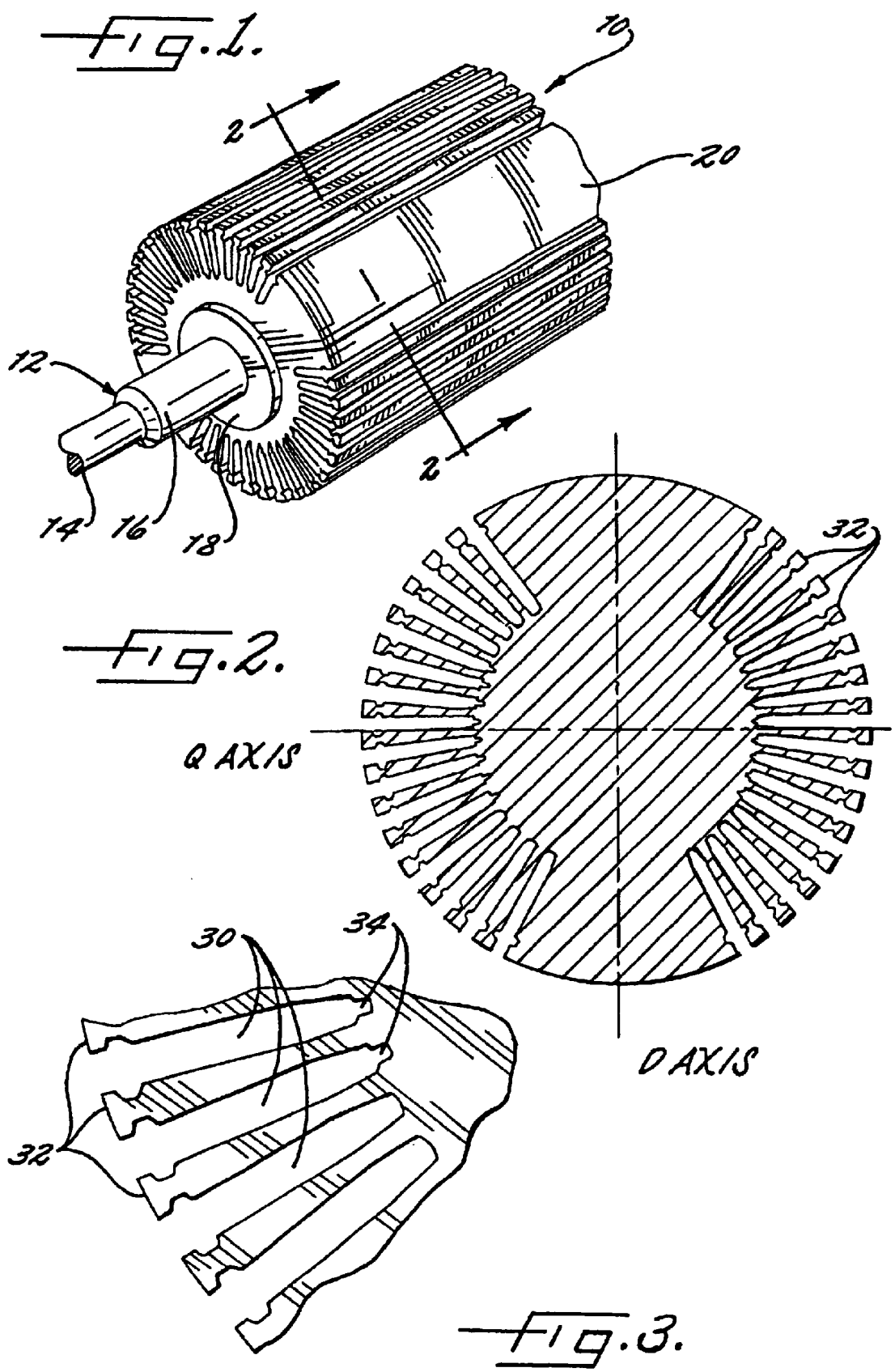

METHOD AND APPARATUS TO TUNE ROTOR'S TORSIONAL NATURAL FREQUENCY BY GEOMETRY OF ROTOR WINDING SLOT

FIELD OF THE INVENTION

This invention relates to rotors used in electrical machines, and more particularly, this invention is related to controlling the torsional natural frequency of a rotor.

BACKGROUND OF THE INVENTION

Rotors are used in many different types of electrical machines, including generators, motors and other similar devices. The rotor in large cylindrical rotor generators is typically made of a single magnetic steel forging. The rotor is cylindrically configured with an outer peripheral surface, having winding slots that are defined by radially projecting winding teeth positioned on the rotor body. Winding wire is then looped about the winding slots at specific areas to form a winding coil.

The rotor winding slot has a north and south pole and a direct (D) axis aligned with the poles and a quadrature (Q) axis midway between poles. The rotor has a natural torsional frequency that is affected by several parameters, mainly, its torsional stiffness and added polar mass moment of inertia $WR^2$.

For reasons of stress, fatigue, performance and other similar reasons, it is desirable to have the torsional natural frequency of the rotor avoid certain values or a range of values. There are numerous prior art methods and systems presently available to control or change the torsional natural frequency of a rotor, especially by the selective choice or changes to any shaft and rotor geometry. Each of these tuning methods and systems, such as the use of geometry choices or changes, typically exhibit a negative effect on another parameter, such as the cost, size, performance, and ability to manufacture the overall machine design.

Other rotor geometries can be designed to suppress undesired pulls and field distortion, production of noise, reduce bearing wear, and increase the power output of a motor. For example, in U.S. Pat. No. 2,698,910 to Blyth, an armature has a toothed structure to form an asymmetrical relation to the motor field and provide a means for suppressing the undesired pulls and field distortion production of noise. It also reduces bearing wear. A plurality of small, half-round dummy slots, or grooves, are positioned in the center of each armature tooth.

U.S. Pat. No. 4,827,172 to Kobayashi discloses a DC motor rotor core having a plurality of shallow and deep slots that are circumferentially and alternatively disposed in the peripheral face of the rotor core at angular intervals about the center axis. This structure increases the power output of the motor by increasing the number of turns, but does not work for torsional tuning by adjustment and selection in a desirable manner.

SUMMARY OF THE INVENTION

The present invention is advantageous and now provides torsional tuning with less negative impact on the overall machine design than prior art methods. In accordance with one aspect of the present invention, a method for tuning the torsional natural frequency of a rotor is disclosed and comprises the step of forming within winding slots defined by radially projecting winding teeth at least one tuning slot that extends radially inward from the bottom of the winding slot a distance to tune the rotor to a desired torsional natural frequency. This tuning slot can have a width smaller than the width of any winding wire received within the winding slot to prevent winding wire from passing into the tuning slot. The tuning slot can be positioned at a location that minimizes impact to the electromagnetic characteristics of the rotor cross-section, such as in slots in proximity of the Q-axis. At least one tuning slot that extends radially inward from the bottom of the winding slot is positioned at the quadrature axis.

In yet another aspect of the present invention, a rotor includes a rotor shaft and a cylindrically configured rotor body having a plurality of radially projecting winding teeth that define winding slots for receiving winding wire therein. The winding slots have a bottom that is spaced radially inward. At least one tuning slot extends radially inward from the bottom of the winding slot a distance that tunes the rotor to a desired torsional natural frequency.

BRIEF DESCRIPTION OF THE DRAWINGS

Other objects, features and advantages of the present invention will become apparent from the detailed description of the invention which follows, when considered in light of the accompanying drawings in which:

FIG. 1 is an isometric view of a rotor of the present invention showing winding slots defined by winding teeth and at least one tuning slot.

FIG. 2 is a sectional view taken along line 2—2 of FIG. 1.

FIG. 3 is an enlarged view of the winding slots positioned at the quadrature axis, and showing the tuning slots located in some of the winding slots.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 1 illustrates generally at 10 a perspective view of a rotor, in accordance with the present invention, and shows a stepped shaft 12 of the rotor with a turned down smaller diameter end 14, and a larger diameter stub portion 16. The rotor body 20 is formed as a single piece forging with the shaft.

The rotor body 20 is cylindrically configured as known to those skilled in the art and is formed as a solid, single piece. It includes a plurality of winding slots 30 that are defined by a plurality of radially projecting winding teeth 32. The winding slots 30 are deep enough to allow sufficient winding wire to be looped about the winding slots and form the rotor coils, as known to those skilled in the art. As shown in the sectional view of FIG. 2, the D-axis corresponds to north and south poles and in some embodiments, includes a quadrature (Q) axis.

In accordance with the present invention, at least one tuning slot 34, and preferably, a plurality of tuning slots, extend radially inward from the bottom of predetermined winding slots a distance sufficient to tune the rotor to a desired torsional natural frequency. FIGS. 2 and 3 illustrate the tuning slots 34 positioned at the bottom of the winding slots 30. The tuning slots are typically dimensioned smaller than the width of any winding wire received within the winding slot and prevent winding wire from passing into the tuning slot. In some instances, however, the tuning slots could be dimensioned wide enough to receive the winding wire, but this technique would not be preferred.

The tuning slots 34 are preferably positioned at a location that minimizes impact to the electromagnetic characteristics of the rotor cross-section, and typically at the quadrature axis as shown in FIG. 2. If the tuning slots 34 were positioned closer to the poles, then the tuning slots could interfere with the electromagnetic characteristics of the rotor.

The tuning slots can be formed by a cutter having a larger first width for the winding slots, and followed by an end portion having a smaller width at its edge. This tool would be shaped in a stepped configuration with a more narrow portion extending from the wider part to form the tuning slot. In most instances, however, it is expected that one skilled in the art would select a first cutter for forming the winding slots, and then replace that first cutter with a second cutter for entry into the winding slots to form the tuning slots. The term cutter wheel is a general term, and could refer to the grinding wheels on high speed cutters used by those skilled in the art.

It is possible also to use software programming with algorithms known to those skilled in the art for determining the depth, number and location of the tuning notches. The present invention is advantageous and provides tuning notches that reduce the torsional stiffness and increase the added polar mass movement of inertia of a rotor shaft and rotor body with the cross-section of the rotor body. It is relatively easy to manufacture the tuning notches as a one or two step process and the depth, number and location of the tuning notches can be determined by appropriate software algorithms, as known to those skilled in the art.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method for tuning the torsional natural frequency of a turbine generator rotor comprising the step of forming within winding slots defined by radially projecting winding teeth at least one tuning slot that extends radially inwardly from the bottom of the winding slot, or from the bottom of a cooling channel under the winding slot, a distance to tune the rotor to a desired torsional natural frequency;
   wherein the at least one tuning slot comprises a set of tuning slots numbering substantially fewer than the winding slots and positioned at a location that minimizes impact to the electromagnetic characteristics of the rotor cross-section.

2. A method for tuning the torsional natural frequency of a generator rotor having opposing poles and a quadrature axis, comprising the step, of forming within the winding slots defined by radially projecting winding teeth that are positioned substantially at the quadrature axis, at least one tuning slot that extends radially inwardly from the bottom of the winding slot, or from the bottom of a cooling channel under the winding slot, a distance to tune the rotor to a desired torsional natural frequency;
   wherein the at least one tuning slot comprises a set of tuning slots numbering fewer than the winding slots and positioned at a location that minimizes impact to the electromagnetic characteristics of the rotor cross-section.

3. A turbine generator rotor comprising:
   a rotor shaft;
   a cylindrically configured rotor body formed as part of the shaft and having a plurality of radially projecting winding teeth defining winding slots for receiving winding wire therein, said rotor body having two or more poles and a quadrature axis, said winding slots having a bottom spaced radially inward and optionally including a cooling channel; and
   at least one tuning slot positioned at the quadrature axis and extending radially inward from the bottom of the winding slot or the bottom of the cooling slot a distance that tunes the rotor to a desired torsional natural frequency, wherein said at least one tuning slot has a width substantially smaller than either the winding slot or the cooling channel;
   wherein the at least one tuning slot comprises a set of tuning slots numbering substantially fewer than the winding slots and positioned at a location that minimizes impact to the electromagnetic characteristics of the rotor cross-section.

4. A generator rotor comprising:
   a rotor shaft;
   a cylindrically configured rotor body formed as part of the shaft, said rotor body having a plurality of radially projecting winding teeth defining winding slots for receiving winding wire therein, said rotor body having two poles and a quadrature axis, said winding slots having a lowest surface formed by either the bottom of the winding slot or the bottom of a cooling channel located radially inward from the winding slot; and
   at least one tuning slot extending radially inward from the lowest surface of the winding slot a distance that tunes the rotor to a desired torsional natural frequency, wherein said winding slots positioned near said poles are devoid of any tuning slot so that fewer that all of said winding slots incorporate a tuning slot.

5. A rotor according to claim 4, wherein said at least one tuning slot has a width smaller than the diameter of any winding wire received within the winding slot to prevent winding wire from passing into the tuning slot.

6. A rotor according to claim 4, wherein the at least one tuning slot is positioned at a location that minimizes impact to the electromagnetic characteristics of the rotor cross-section.

* * * * *